March 14, 1972 R. B. HOLDEN ETAL 3,649,473
DETERMINATION OF HYDROGEN IN A HIGH TEMPERATURE
FLUID AND APPARATUS THEREFOR
Filed Dec. 8, 1969
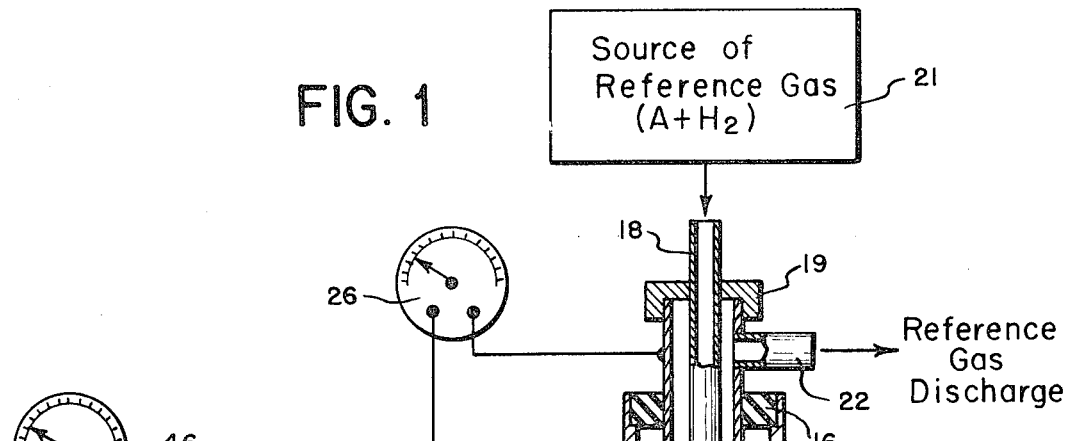
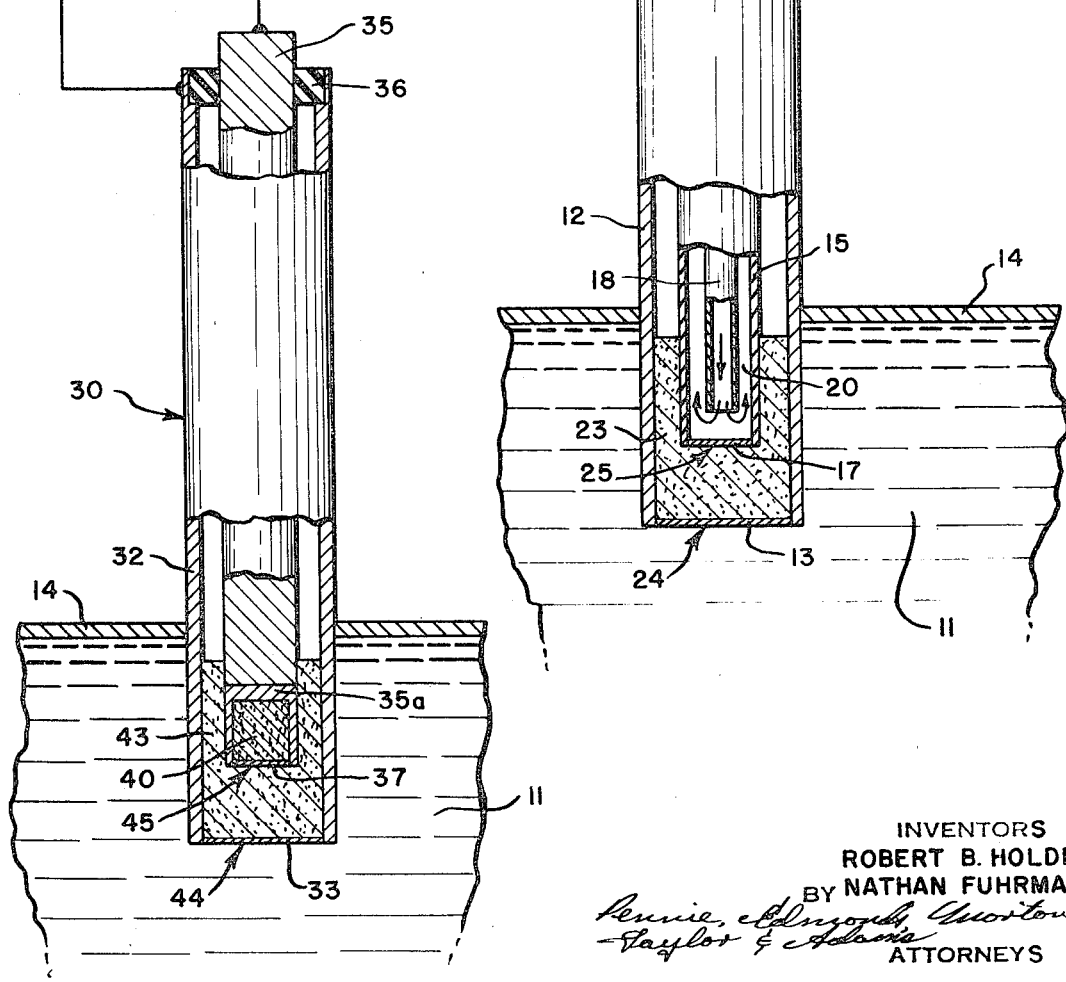
INVENTORS
ROBERT B. HOLDEN
NATHAN FUHRMAN
BY
ATTORNEYS United States Patent Office 3,649,473
Patented Mar. 14, 1972

3,649,473
DETERMINATION OF HYDROGEN IN A HIGH TEMPERATURE FLUID AND APPARATUS THEREFOR
Robert B. Holden, Scarsdale, and Nathan Fuhrman, Shrub Oak, N.Y., assignors to the United States of America as represented by the United States Atomic Energy Commission
Filed Dec. 8, 1969, Ser. No. 883,153
Int. Cl. G01n 27/30, 27/26
U.S. Cl. 204—1 T
21 Claims

ABSTRACT OF THE DISCLOSURE

The hydrogen activity of a high temperature fluid such as liquid sodium is measured by immersing thereinto a probe that forms an equilibrium electrolytic cell. The probe comprises a closed-end metal tube that is impervious to the fluid, the tube being provided with a hydrogen sensing electrode portion that is permeable to hydrogen. Inside the tube is a hydrogen reference electrode electrically insulated therefrom. The space between the closed end of the probe and the reference electrode is filled with a fused salt electrolyte containing an oxygen-bearing ion that reacts with elemental hydrogen. A potentiometer measures the difference in electrical potential between the sensing electrode and the reference electrode to provide an accurate measure of the hydrogen activity of the fluid.

BACKGROUND OF THE INVENTION (1) Field of the invention

This invention relates to the determination of hydrogen content in a high temperature fluid using an equilibrium electrolytic cell, the EMF of which corresponds to the hydrogen content in the fluid.

(2) Description of the prior art

The need for a simple, economical and yet reliable method for measuring hydrogen content in high temperature fluids is increasing. For example, it is important to monitor the hydrogen content of process gas streams in many chemical and metallurgical processes. It is also necessary to continuously monitor the hydrogen content of many liquid metals, such as liquid sodium and liquid NaK, the preferred coolants for fast breeder reactors and for some other nuclear reactors, as the tolerance for hydrogen in the liquid metal used in the aforesaid systems is very low.

In nuclear reactors employing hydride nuclear fuels hydrogen migrates from the nuclear fuel into the coolant and thence to the power conversion system which is undesirable. Similarly in reactors which contain structural materials that absorb hydrogen, such as niobium, vanadium, and zirconium, the hydriding potential of the liquid metal is of great significance because of potential embrittlement of the structural metal or the nuclear fuel cladding. In the latter case, very small concentrations of hydrogen may be dangerous. It is also important to monitor the hydrogen content in liquid sodium used as coolant in a breeder reactor system because of the possibility of plugging by sodium hydride and because it may act as an indicator of sodium-to-water leaks in steam generators. In addition, the hydrogen content of sodium may have a major effect upon the activity of other impurities, such as carbon with which it may combine to form methane.

The hydrogen content in a high temperature fluid can be determined by standard analytical techniques such as by chemical anlysis, chemical absorption, heat of combustion and thermal conductivity. These prior methods, however, are not readily adaptable for use in continuous analyses and generally are suitable only for measuring the hydrogen concentrations in gases. For continuous monitoring hydrogen content of sodium, two types of sensors for the in-line detection or measurement of hydrogen have heretofore been used. Both types of sensors depend upon the diffusion of hydrogen out of sodium and through a nickel diaphragm to a means of detection. The first of these consists of a nickel thimble positioned in the sodium line. The interior of the thimble is connected to a vacuum system equipped with a pressure gauge. The operation of this type of detector is based on the fact that the injection of hydrogen into the sodium is followed by a rise in pressure of the gauge. The second device consists of a nickel-plated palladium coil immersed in the sodium. Hydrogen diffusion through both the nickel and the palladium is catalytically oxidized to water in an oxygen stream passing through the tube. The concentration of the water in the oxygen stream then is taken as a measure of the hydrogen content of the sodium.

Both of these continuous monitoring devices are, in essence, hydrogen extractors and suffer from the disadvantage that they do not measure directly the activity of the hydrogen in the sodium. In the first type, a pressure is measured and in the second the concentration of water in oxygen is measured. Another aspect of hydrogen monitoring by extraction is that, in principle, it must always change the hydrogen concentration in the region being measured. In a large system where the sodium is moving rapidly past the sensor this effect will be insignificant. However, in a smaller system, or in relatively stagnant fluid medium, this can be a serious perturbation.

In co-pending U.S. patent application Ser. No. 675,960, filed Oct. 17, 1967, a method and apparatus is described for continuously monitoring the hydrogen content of a temperature fluid without consuming or withdrawing a significant quantity of hydrogen from the fluid. In this procedure an equilibrium galvanic cell is established in which the electrical potential of a hydrogen sensing electrode in contact with the fluid is measured with respect to the potential of a reference electrode of known hydrogen activity, the electrolyte of the cell being an alkali metal or alkaline earth metal salt containing an ionized metal hydride. This electrolyte conducts electricity by the transport of hydride ions through the salt from one electrode to the other. The difference in electrical potential between the two electrodes, the EMF of the galvanic cell, provides a direct measure of the hydrogen activity, and hence the hydrogen content, of the fluid being monitored.

SUMMARY OF THE INVENTION

We have now made the surprising and wholly unexpected discovery that the hydrogen content of a high temperature fluid can be continuously monitored by the use of an equilibrium galvanic cell that employs as an electrolyte a molten salt that contains an oxide ion or oxygen-bearing ion. The oxygen-bearing ion must be capable of reacting with elemental hydrogen to produce or consume free electrons, and the resulting reaction product must be mobile in the fused salt electrolyte so that it can migrate from one electrode to the other. Our investigations have shown, quite unexpectedly, that electrochemical hydrogen meters utilizing such oxygen ion-containing electrolytes have improved reliability, sensitivity and longevity.

Pursuant to the aforesaid discovery, the improved method of the invention comprises contacting the fluid of unknown hydrogen content with one surface of a hydrogen sensing electrode formed of an electrically conductive material that is permeable to hydrogen. A molten salt electrolyte is brought into contact with the opposite surface of the sensing electrode, said molten salt electrolyte containing oxygen-bearing ions that react with elemental hydrogen to produce a hydrogen-containing product and free electrons. The electrolyte is also contacted with one surface of a reference electrode formed from an electrically conductive material that is permeable to hydrogen, the opposite surface of the reference electrode being contacted with a hydrogen-bearing material of known hydrogen activity. The difference in electrical potential between the hydrogen sensing electrode and the hydrogen reference electrode is measured to determine the hydrogen activity of the fluid being monitored.

The apparatus of the invention comprises a fluid impervious probe having a fluid contacting portion the outer surface of which is adapted to be contacted by the fluid of unknown hydrogen content, the fluid contacting portion of the probe being provided with a hydrogen sensing electrode formed of an electrically conductive material that is permeable to hydrogen. A hydrogen reference electrode is disposed adjacent and spaced away from the fluid contacting portion of the probe, the reference electrode comprising a chamber containing a hydrogen-bearing material of known hydrogen activity disposed in contact with the inner surface of the chamber, at least a portion of the wall of said chamber being formed of an electrically conductive material that is permeable to hydrogen. A molten salt electrolyte is disposed in the space between the fluid contacting portion of the probe and the reference electrode in contact with the inner surface of the sensing electrode and the outer surface of the reference electrode. The electrolyte contains an oxygen-bearing ion that reacts with elemental hydrogen to produce a hydrogen-containing product and free electrons. A potentiometer is electrically connected to the sensing electrode and to the reference electrode in order to measure the difference in electrical potential between the two electrodes and thereby determine the hydrogen activity of the fluid being monitored.

BRIEF DESCRIPTION OF THE DRAWING

FIG. 1 is a schematic view, partly in section, of an electrochemical hydrogen meter embodying the invention, the hydrogen-bearing material of the reference electrode being in the form of a gas, and FIG. 2 is a schematic view, partly in section, of a hydrogen meter similar to that shown in FIG. 1, the hydrogen-bearing material of the reference electrode being in the form of a liquid or solid.

DETAILED DESCRIPTION

In the advantageous embodiment of the invention shown in FIG. 1, the electrochemical hydrogen meter comprises a metal probe 10 one end of which is adapted to be immersed in the high temperature fluid 11 the hydrogen content of which is being monitored. The probe 10 comprises an outer tube 12 formed of a metal that is impervious and inert with respect to the fluid being monitored, the bottom end of the tube 12 being closed off by a thin septum 13 formed of a metal that is impervious and inert with respect to the fluid 11 but that is permeable with respect to hydrogen at the temperature at which the device is designed to be used. The fluid 11, which may be a gas (for example, a hydrogen-containing process gas) or a liquid (for example, liquid sodium employed as a coolant in a nuclear reactor), is contained within a suitable vessel or conduit 14 through which the fluid circulates. The tube 12 is advantageously formed of a corrosion-resistant metal such as stainless steel, and the hydrogen-permeable septum 13 is advantageously formed of iron or nickel or alloys of these metals.

A second metal tube 15 is mounted concentrically within the outer tube 12 by means of the annular member 16 that is formed of an electrically insulating material. The closed bottom end of the tube 15 comprises a septum 17 that is disposed adjacent but is spaced a short distance away from the closed bottom end of the tube 12. The tube 15 is advantageously formed of a corrosion-resistant metal and the septum 17 is formed of a hydrogen-permeable metal such as iron or nickel or the alloys of these metals.

A third metal tube 18 is mounted concentrically within the second tube 15 by means of the annular mounting member 19. The open bottom end of the tube 18 terminates a short distance away from the closed bottom end of the tube 15 so that a reference gas 20 containing a known amount of hydrogen can be circulated through the tube 15 in intimate contact with the septum 17. This hydrogen-containing reference gas from gas source 21 is introduced into the probe 10 at the upper end of the tube 18 and is discharged therefrom through the outlet pipe 22 that communicates with the interior of the second tube 15.

The reference gas 20 comprises an inert carrier gas containing a predetermined minor amount of elemental hydrogen so that the reference gas will have a known and predetermined hydrogen activity. The inert carrier gas is advantageously argon or nitrogen, although other gases that are stable and non-reactive at the operating temperature of the device may be used. The hydrogen in the reference gas may be introduced thereinto in the form of pure elemental hydrogen or it may be present therein as the result of the dissociation of a hydrogen-containing gas such as ammonia or water vapor. We presently prefer to use as the reference gas pure argon containing about 1000 p.p.m. by volume of hydrogen.

A non-aqueous electrolyte 23 is disposed within the outer tube 12 in contact with the hydrogen permeable septum 13 of the tube 12 and with the hydrogen permeable septum 17 of the second tube 15. The electrolyte comprises a solvent salt that is molten at the operating temperature of the device and an ionizable oxygen-bearing compound that is dissolved in the solvent salt. The solvent salt advantageously comprises one or more alkali metal halides or alkaline earth metal halides, and preferably comprises a eutectic mixture of at least two of these alkaline salts (for example, the LiCl/KCl eutectic). The oxygen-bearing compound dissolved in the solvent salt must be at least partially ionized, and the resultant oxygen-bearing ion must be one that will react with elemental hydrogen to produce both a hydrogen-containing compound that is mobile in the electrolyte and free electrons. The oxygen-bearing solute advantageously comprises an ionizable metal oxide such as the alkali metal oxides, the alkaline earth metal oxides, aluminum oxide and the like. Other ionizable oxygen-bearing compounds that may be used include the alkali metal hydroxides, the alkaline earth metal hydroxides and the carbonates of the alkali metals and alkaline earth metals that will dissolve and ionize in the solvent salt.

The assembled probe 10 comprising the outer tube 12 and septum 13, the second tube 15 and septum 17, the third tube 18 and reference gas 20, and the oxygen-bearing electrolyte 23 constitutes a galvanic cell with respect to which the septum 13 in contact with the fluid 11 comprises a hydrogen sensing electrode 24 and the septum 17 in contact with the reference gas 20 comprises a hydrogen reference electrode 25. The septum 13 of the hydrogen sensing electrode 24 and the septum 17 of the hydrogen reference electrode 25 are electrically connected to a potentiometer 26 which measures the difference in electrical potential between the sensing electrode and the reference electrode. As the hydrogen activity of the reference electrode 25 is known, this difference in electrical potential provides a direct measurement of the hydrogen activity of the sensing electrode 24 which, in turn, is directly related to the hydrogen content of the fluid 11.

In the embodiment of the invention shown in FIG. 2, the electrochemical hydrogen meter is in all respects similar to that shown in FIG. 1 with the exception that the reference gas 20 is replaced by a condensed phase (that is, a solid or liquid) hydrogen-bearing material of known hydrogen activity. Thus, the probe 30 comprises an outer tube 32 the bottom end of which is closed by a hydrogen permeable septum 33. A cylindrical member 35 is mounted concentrically within the outer tube 32 by means of the annular electrically insulating member 36. The lower end of the cylindrical member 35 is provided with a chambered extension 35a the bottom end of which chambered extension is closed by a hydrogen permeable septum 37. The chambered extension 35a contains a solid or liquid material 40 of known hydrogen activity. A molten salt electrolyte 43 containing an oxygen-bearing ion is disposed in the lower portion of the outer tube 32 in contact with the hydrogen permeable septum 33 and the hydrogen permeable septum 37. The molten salt electrolyte 43 is in all respects identical to the molten salt electrolyte 23 that has been previously described in connection with the probe shown in FIG. 1. The assembled probe 30 comprises a galvanic cell with respect to which the hydrogen permeable septum 33 in contact with the fluid 11 comprises a hydrogen sensing electrode 44 and the hydrogen permeable septum 37 in contact with the hydrogen-bearing reference material 40 comprises a hydrogen reference electrode 45. The aforesaid hydrogen sensing electrode 44 and hydrogen reference electrode 45 are electrically connected to a potentiometer 46, the difference in electrical potential between the two electrodes providing a direct measurement of the hydrogen activity, and hence the hydrogen content, of the fluid 11.

As noted, the hydrogen-containing material 40 in contact with the hydrogen permeable septum 37 may be either a liquid or solid of known hydrogen activity. For example, material 40 may comprise an intimate two phase mixture of a metal and the corresponding metal hydride in equilibrium with each other, the two phase mixture of the metal and its metal hydride providing a hydrogen source of known hydrogen activity. Alternatively, the hydrogen-bearing material 40 may comprise a two phase solid or liquid solution of a metal and its metal hydride that contains a precipitated or an undissolved quantity of the metal hydride, and we presently prefer to use as the hydrogen reference material an alkali metal or alkaline earth metal that is saturated with and contains an undissolved excess of the corresponding alkali metal or alkaline earth metal hydride.

The hydrogen activity of a high temperature fluid of unknown hydrogen content is determined by bringing the bottom end of the probe 10 (or probe 30) into contact with the fluid 11 being monitored. In a typical case, the fluid 11 is molten sodium that is at a temperature of between 400 and 600° C. Within a relatively short period of time the entire lower end of the probe, including the septum 13, the molten salt electrolyte 23 and the septum 17, is heated to essentially the same temperature. Hydrogen from the fluid 11 dissolves in the hydrogen permeable septum 13 until the hydrogen content of the septum 13 is in equilibrium with the hydrogen content of the fluid 11. Similarly, hydrogen contained in the reference gas 20 (or, in the case of probe 30, hydrogen contained in the hydrogen-bearing material 40) dissolves in the hydrogen permeable septum 17 until the hydrogen content of the septum 17 is in equilibrium with the hydrogen content of the reference gas 20. As noted, the septum 13 and the fluid 11 comprise the sensing electrode 24, and the septum 17 and the reference gas 20 comprise the reference electrode 25. At equilibrium, each electrode acquires the hydrogen activity of the medium with which it is in contact. The driving force tending to equalize hydrogen activity of the two electrodes generates a cell EMF given by the following relationship:

$$EMF = \frac{RT}{2F} \ln \frac{[H]_{ref}}{[H]_x}$$

Where $[H]_{ref}$ and $[H]_x$ are the hydrogen activities of the reference electrode and the fluid 11 being measured, respectively; R is the gas constant; F is the Faraday constant; and T is the absolute temperature. The electrode proceses are (a) an oxidation reaction at the electrode having the higher hydrogen pressure as a result of which reaction free electrons are produced, and (b) a reduction reaction at the other electrode, the reverse of the first reaction, as a result of which reduction reaction free electrons are consumed. The net effect is to transport hydrogen across the cell.

The difference in hydrogen activity of the septum 13 and the septum 17 is reflected by a difference in the electrical potential between the two septa that is, measured by the potentiometer 26. Thus, by potentiometric measurement of the cell EMF, a means is available for continuously and nondestructively monitoring the hydrogen content of high temperature systems such as liquid metals and gaseous media. Because the measurement is potentiometric very little hydrogen is transferred so that the hydrogen content of the system is unperturbed. Since $[H]_{ref}$ is constant at constant temperature, the device can be calibrated to yield a relationship between EMF and the hydrogen activity of the unknown fluid.

The electrochemical reactions that take place at the two electrodes between the elemental hydrogen dissolved in the septa and the oxygen-bearing ion dissolved in the molten salt electrolyte are not fully understood. One possible explanation of the results observed in the case of ionizable metal oxides is that these oxides ionize to form oxide ions which then react with elemental hydrogen at the electrode having the higher hydrogen activity (say, the sensing electrode 24) to produce water and free electrons possibly in accordance with the following electrode reaction:

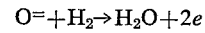
$$O^= + H_2 \rightarrow H_2O + 2e$$

Conversely, the reverse reaction is possible at the other electrode (in this case, the reference electrode) where water vapor plus two electrons will produce elemental hydrogen and an oxide ion.

In the case of ionizable metal hydroxides dissolved in the molten solvent salt it is possible that hydroxide ions react with elemental hydrogen in accordance with the following electrode reaction:

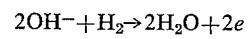
$$2OH^- + H_2 \rightarrow 2H_2O + 2e$$

Conversely, if there is a deficiency of hydrogen at the other electrode, the reverse electrode reaction is possibly that which takes place.

In the case of certain alkaline earth metal carbonates it is probable that a small but electrochemically significant amount of the dissolved carbonate molecule decomposes to produce the corresponding alkaline earth metal oxide and carbon dioxide gas. The alkaline earth metal oxide then ionizes to produce an oxide ion that, it is believed, reacts with elemental hydrogen in the manner previously described. Irrespective, however, of the true explanation of the electrode reactions taking place within the hydrogen meter of the invention, the device provides a reliable, sensitive and accurate means for determining the hydrogen activity of a fluid of unknown hydrogen content.

The following example is illustrative, but is not limitative, of the practice of our invention.

A hydrogen meter embodying the structure of the meter shown in FIG. 1 was prepared. The septa 13 and 17 were iron. The electrolyte 23 was the lithium chloride-potassium chloride eutectic containing 0.2 mole percent of calcium oxide. The reference gas 20 in contact with the septum 17 was pure argon containing 0.48 mole percent of elemental hydrogen. The fluid 11 being monitored was a gas the hydrogen content of which was varied at will. The EMF of the cell was observed when the reference gas and the "unknown" gas were at a temperature of 460° C. The EMF of the cell changed by the amount of 11 mv. when the hydrogen level of the fluid 11 changed from 5.0 mole percent to 0.5 mole percent of hydrogen. The polarity of the cell agreed with that which would be expected from the electrode reactions previously described.

We claim:

1. Apparatus for measuring the hydrogen activity of a fluid of unknown hydrogen content which comprises:
   a fluid impervious probe having a fluid contacting portion the outer surface of which is adapted to be contacted by the fluid of unknown hydrogen content, said fluid contacting portion being provided with a hydrogen sensing electrode formed of an electrically conductive material that is permeable to hydrogen.
   a reference electrode disposed adjacent and spaced away from the fluid contacting portion of the probe, said reference electrode comprising a chamber containing a hydrogen bearing material of known hydrogen activity disposed in contact with the inner surface of the chamber, at least a portion of the wall of said chamber being formed of an electrically conductive material that is permeable to hydrogen,
   a molten salt electrolyte disposed in the space between the fluid contacting portion of the probe and the reference electrode in contact with the inner surface of the sensing electrode and the outer surface of the reference electrode, said electrolyte containing an oxygen-bearing ion that reacts with elemental hydrogen to produce a hydrogen-containing product and free electrons, and
   potentiometer means electrically contacted to the sensing electrode and to the reference electrode for measuring the difference in electrical potential between said electrodes.

2. The apparatus according to claim 1 in which the hydrogen permeable material of the electrode is a metal selected from the group consisting of iron, nickel and alloys of these metals.

3. The apparatus according to claim 1 in which the probe comprises a metal tube the closed bottom end of which comprises the sensing electrode, and in which the reference electrode comprises a second tubular element electrically insulated from and disposed concentrically within said probe, the closed end of said second tubular element being disposed adjacent and spaced from the closed bottom end of the probe.

4. The apparatus according to claim G in which the molten salt electrolyte comprises a solvent salt selected from the group consisting of alkali metal halides, alkaline earth metal halides and mixtures thereof, and an ionizable oxygen-bearing inorganic compound dissolved in said solvent salt.

5. The apparatus according to claim 1 in which the molten salt electrolyte comprises a solvent selected from the group consisting of alkali metal halides, alkaline earth metal halides and mixtures thereof, and an ionizable oxygen-bearing solute selected from the group consisting of ionizable metal oxides, ionizable metal hydroxides and ionizable oxygen-bearing salts dissolved in said solvent.

6. The apparatus according to claim 1 in which the molten salt electrolyte comprises a solvent selected from eutectic mixtures of at least two salts of the group consisting of alkali metal halides and alkaline earth metal halides, and an ionized solute dissolved in said solvent, said solute being selected from at least one of the group consisting of the ionizable oxides and hydroxides of the alkali metals, the ionizable oxides and hydroxides of the alkaline earth metals and aluminum oxide.

7. The apparatus according to claim 1 in which the hydrogen-bearing material of known hydrogen content of the reference electrode comprises a two phase mixture of a metal having a predetermined amount of the corresponding metal hydride therein.

8. The apparatus according to claim 1 in which the hydrogen-bearing material of the reference electrode comprises an alkali metal or alkaline earth metal that is saturated with and contains an undissolved excess of the corresponding alkali metal hydride or alkaline earth metal hydride.

9. The apparatus according to claim 1 in which the hydrogen-bearing material of the reference electrode comprises a hydrogen-containing gas of predetermined hydrogen content.

10. The apparatus according to claim 1 in which the hydrogen-bearing material of the reference electrode comprises an inert gas containing a predetermined amount of elemental hydrogen.

11. The apparatus according to claim 1 in which means are provided for delivering a reference gas of known hydrogen content to the interior of the chamber of the reference electrode where said gas contacts the inner surface of said chamber.

12. The apparatus according to claim 11 in which the probe comprises a metal tube the closed bottom end of which comprises the sensing electrode, in which the reference electrode comprises a second metal tube disposed concentrically within the outer metal tube of the probe, the closed bottom end of the second metal tube being located adjacent and spaced from the closed bottom end of the probe, and in which the means for delivering the reference gas to the interior of the reference electrode comprises a third tubular element disposed concentrically within the metal tube of the reference electrode, the open bottom end of said third tubular element being located adjacent the closed bottom end of the reference electrode, the open upper end of said third tubular element being connected to a source of said reference gas.

13. Method for measuring the hydrogen activity of a fluid of unknown hydrogen content which comprises:
    contacting the fluid of unknown hydrogen content with one surface of a hydrogen sensing electrode formed of an electrically conductive material that is permeable to hydrogen,
    contacting the opposite surface of the hydrogen sensing electrode with a molten salt electrolyte containing an oxygen-bearing ion that reacts with elemental hydrogen to produce a hydrogen-containing product and free electrons,
    contacting said molten salt electrolyte with one surface of a reference electrode formed of an electrically conductive material that is permeable to hydrogen.
    contacting the opposite surface of said reference electrode with a hydrogen-bearing material of known and predetermined hydrogen activity, and
    measuring the difference in electrical potential between said sensing electrode and said reference electrode.

14. The method according to claim 13 in which the hydrogen permeable material is a metal selected from the group consisting of iron, nickel and alloys of these metals.

15. The method according to claim 13 in which the molten salt electrolyte comprises a solvent salt selected from the group consisting of alkali metal halides, alkaline earth metal halides and mixtures thereof, and an ionizable oxygen-bearing inorganic compound dissolved in said solvent salt.

16. The method according to claim 13 in which the molten salt electrolyte comprises a solvent selected from the group consisting of alkali metal halides, alkaline earth metal halides and mixtures thereof, and an ionizable oxygen-bearing solute selected from the group consisting of ionizable metal oxides, ionizable metal hydroxides and ionizable oxygen-bearing salts dissolved in said solvent.

17. The method according to claim 13 in which the molten salt electrolyte comprises a solvent selected from eutectic mixtures of at least two salts of the group consisting of alkali metal halides and alkaline earth metal halides, and an ionized solute dissolved in said solvent, said solute being selected from at least one of the group consisting of the ionizable oxides and hydroxides of the alkali metals, the ionizable oxides and hydroxides of the alkaline earth metals and aluminum oxide.

18. The method according to claim 13 in which the hydrogen-bearing material of known hydrogen content of the reference electrode comprises a two phase mixture of a metal having a predetermined amount of the corresponding metal hydride therein.

19. The method according to claim 13 in which the hydrogen-bearing material of the reference electrode comprises an alkali metal or alkaline earth metal that is saturated with and contains and undissolved excess of the corresponding alkali metal hydride or alkaline earth metal hydride.

20. The method according to claim 13 in which the hydrogen-bearing material of the reference electrode comprises a hydrogen-containing gas of predetermined hydrogen content.

21. The method according to claim 13 in which the hydrogen-bearing material of the reference electrode comprises an inert gas containing a predetermined amount of elemental hydrogen.

References Cited

UNITED STATES PATENTS

| | | | |
|---|---|---|---|
| 3,378,478 | 4/1968 | Kolodney et al. | 204—1 T X |
| 3,410,780 | 11/1968 | Holden | 204—195 |
| 3,417,009 | 12/1968 | Holden | 204—1 T X |

GERALD L. KAPLAN, Primary Examiner

U.S. Cl. X.R.

204—195; 324—29, 33, 71 R